Nov. 14, 1933.                H. ZIEGLER                1,935,535
ARTIFICIAL MARBLE OR STONE
Filed March 14, 1931      3 Sheets-Sheet 1
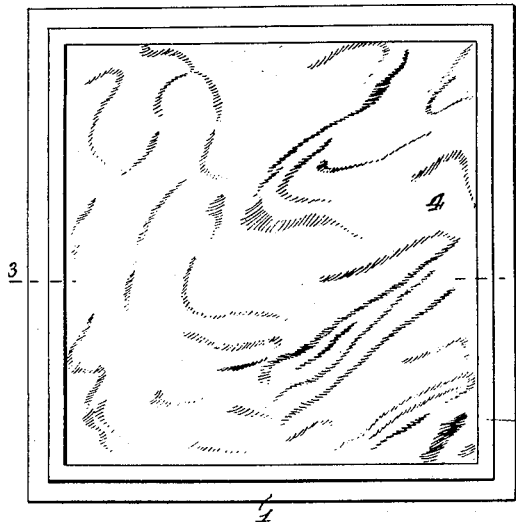
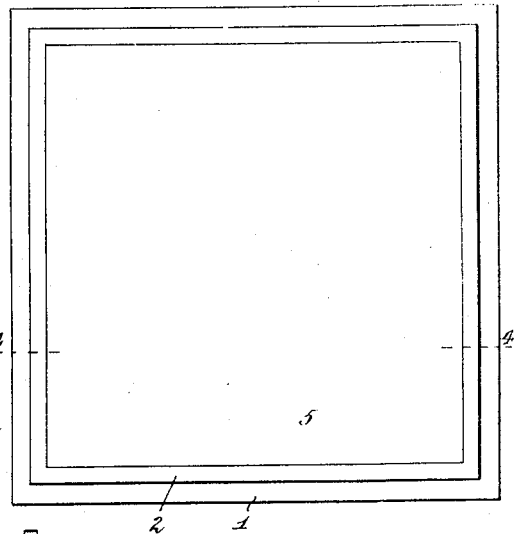
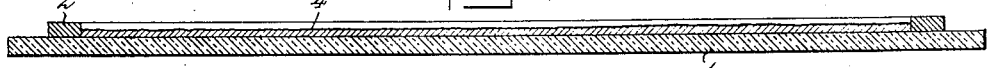
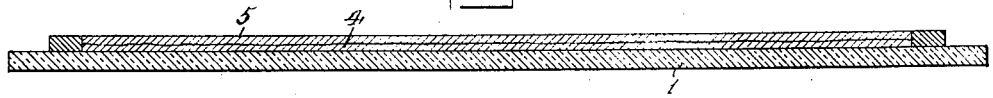
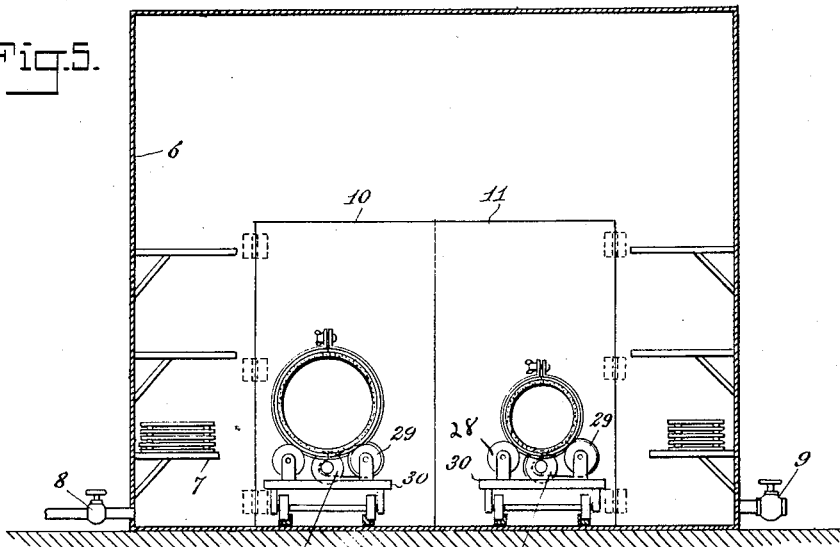
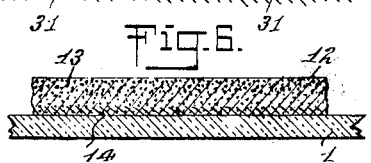
WITNESSES
INVENTOR
Herman Ziegler
BY
ATTORNEYS Nov. 14, 1933.  H. ZIEGLER  1,935,535
ARTIFICIAL MARBLE OR STONE
Filed March 14, 1931  3 Sheets-Sheet 2
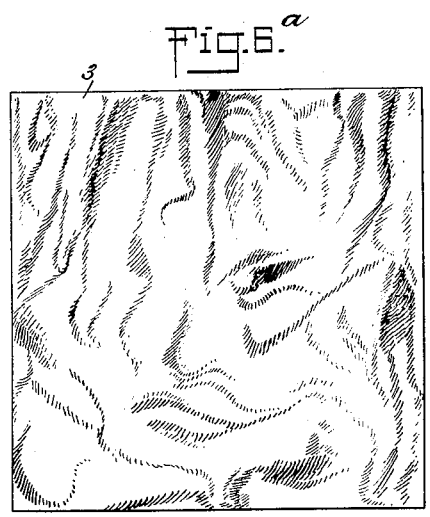
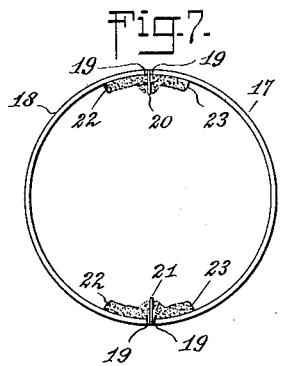
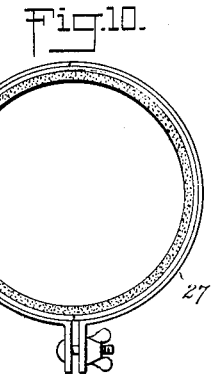
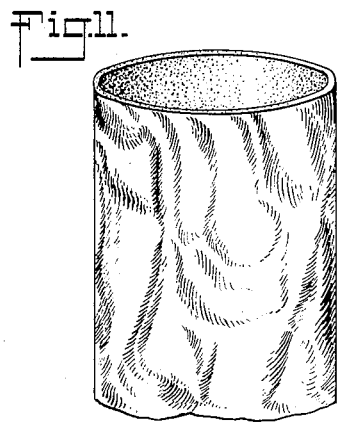
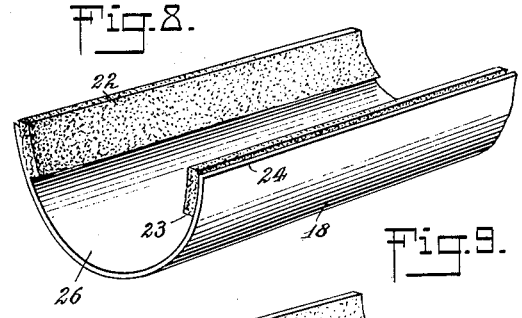
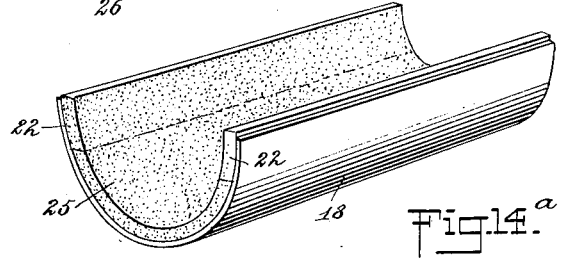
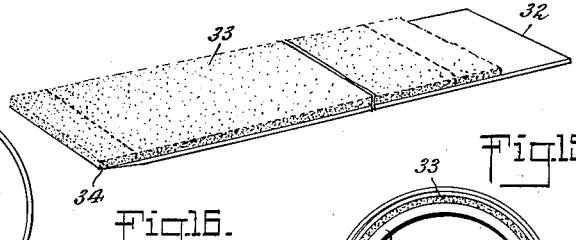
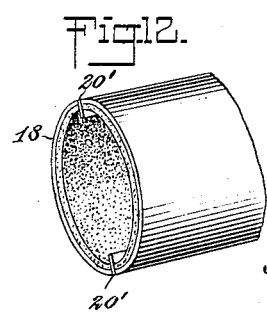
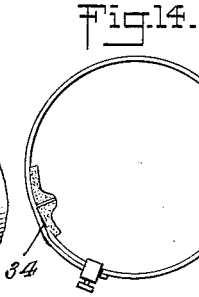
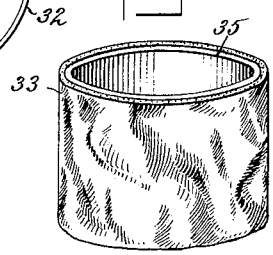
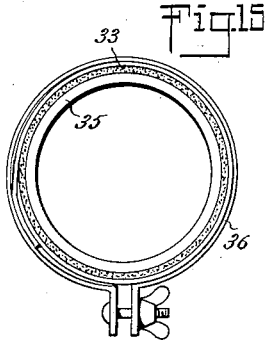
WITNESSES
INVENTOR
Herman Ziegler
BY
ATTORNEYS Nov. 14, 1933.  H. ZIEGLER  1,935,535
ARTIFICIAL MARBLE OR STONE
Filed March 14, 1931  3 Sheets-Sheet 3
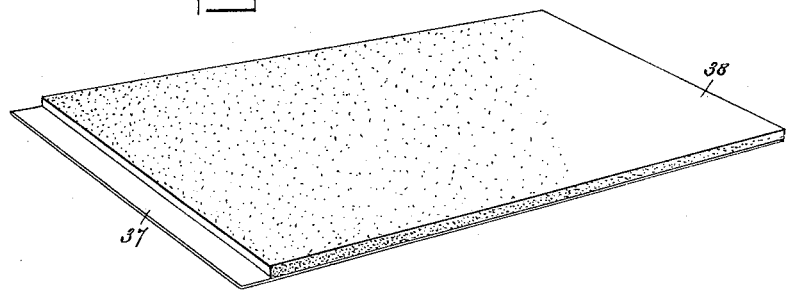
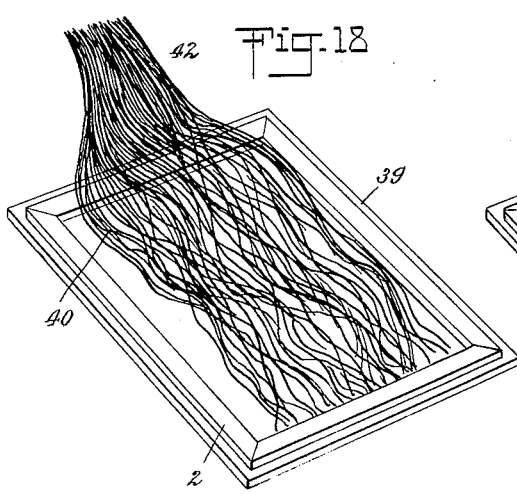 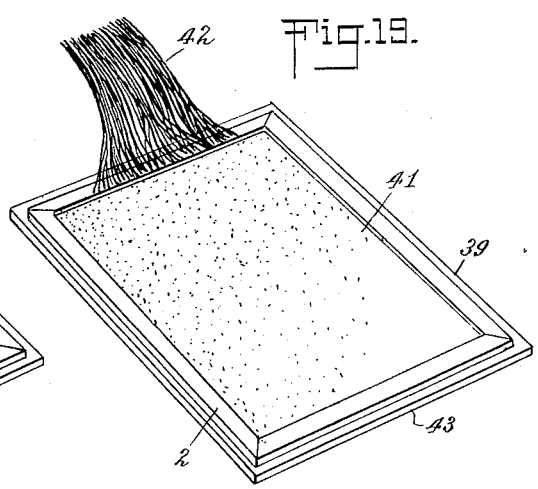
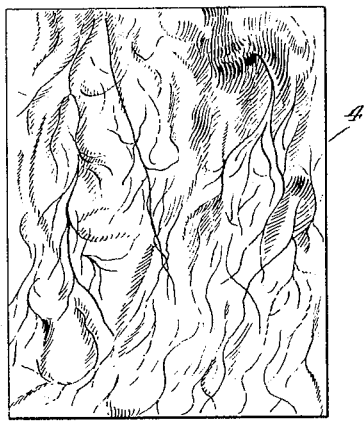 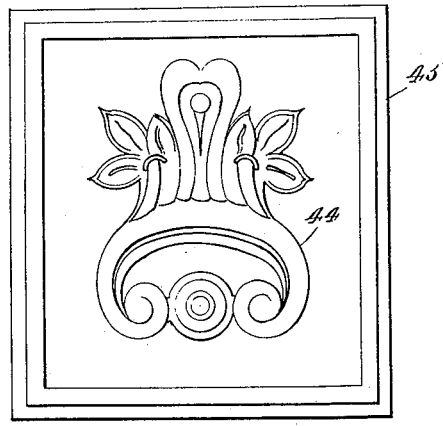
WITNESSES
INVENTOR.
Herman Ziegler
BY
ATTORNEYS Patented Nov. 14, 1933

1,935,535

UNITED STATES PATENT OFFICE 1,935,535

ARTIFICIAL MARBLE OR STONE

Herman Ziegler, Maspeth, N. Y.

Application March 14, 1931. Serial No. 522,684

5 Claims. (Cl. 18—48.8)

This invention relates to an artificial marble or stone and the method of making the same, the object being to provide a simplified method which will produce an artificial stone equal in appearance to natural marble or other stone.

Another object of the invention is to provide an improved method for producing an artificial stone or marble wherein the product has not only the appearance of genuine stone, but presents a structure which is smooth and has a fine surface grain as well as a structure which will resist the action of the elements.

A further object is to provide an artificial stone wherein the coloring matter may be only in the surface or may permeate the stone from the front to the back.

A further object is to provide a complete stone in which lacquer or shellac is used and which thoroughly permeates the stone so as to resist the action of water and the elements at all times.

An additional object, more specifically, is the use of a process and the provision of a finished article which may be in the nature of a flat stone or slab, or in the nature of an ornament or a curved surface, as for instance a column.

In the accompanying drawings—

Figure 1 is a plan view of a pallet or support with a supply of prepared cement and a supporting wall associated therewith, disclosing one of the first steps of the invention.

Figure 2 is a view similar to Figure 1, but showing a backing applied to the cast for artificial marble.

Figure 3 is a sectional view of Figure 1 on line 3—3, the same being on an enlarged scale.

Figure 4 is a sectional view through Figure 2 on line 4—4, the same being on an enlarged scale.

Figure 5 is a transverse sectional view through a compression chamber used in carrying out the method of producing the article embodying the invention.

Figure 6 is a fragmentary sectional view showing how the air bubbles flow upwardly while the finer cement flows downwardly, forming a smooth hard surface.

Figure 6a is a plan view of a finished slab or plate.

Figure 7 is an end view of a mold showing the first steps of forming a cylindrical piece of artificial marble.

Figure 8 is a perspective view of one-half of the showing of Figure 7, the same being on an enlarged scale.

Figure 9 is a view similar to Figure 8 but showing the parts filled in whereby a complete half-cylinder is presented.

Figure 10 is a view of two members identical with that shown in Figure 9, together with a clamp for holding the mold in proper place.

Figure 11 is a perspective view showing a part of the finished cylindrical or tubular member shown in Figure 10.

Figure 12 is a view similar to Figure 7 except that it is in perspective and illustrates how two semicircular slabs may be provided.

Figure 13 is a perspective view showing one of the slabs formed in the mold shown in Figure 12.

Figure 14 is a top plan view of a flexible mold wound in a circular form and showing the connecting blocks of cement arranged at the juncture.

Figure 14a is a perspective view of a thin flexible pallet with a coating of artificial marble thereon ready to be applied to a round post or other round object.

Figure 15 is a plan view of the structure shown in Figure 14 after the same has been applied to the tubular portion or column, the same being shown in connection with a clamp for holding the parts in position until the cement has set.

Figure 16 is a perspective view of a part of the column shown in Figure 15 after the mold and clamp have been removed.

Figure 17 is a perspective view of a thin piece of paper or other very flexible material provided with a coating of artificial marble in the green state preparatory to being applied to a surface.

Figure 18 is a perspective view of a pallet or other support with a number of dyed strands of silk placed thereon.

Figure 19 is a view similar to Figure 18, but showing a supply of marble cement in a green state applied on top of the silk strands.

Figure 20 is a view of the slab of marble cement shown in Figure 19 after the silk strands have been pulled therethrough.

Figure 21 is a plan view of the pallet having an ornamental member thereon arranged in relief.

Figure 22 is a somewhat enlarged sectional view through a slab after it has been impregnated with lacquer or shellac.

In producing a slab, a column, solid or tubular, or producing any desired article, certain steps are necessary in order to secure in an efficient manner the result shown in a limited manner in the accompanying drawings. Heretofore, it has been difficult to distribute the colors in making artificial stone or marble and also it has been difficult to prevent cracking or holes in the surface of artificial marble. By the improved steps of the present invention, finished slabs or other articles may be provided having a close-grained outer surface, which has the coloring matter properly distributed to give any desired marble effect and in fact, an effect of any desired kind in respect to the distribution of coloring matter, whereby desired designs may be secured.

In order that the invention may be fully understood, the same will be described in respect to the drawings which show several articles which embody the invention and the way these articles have been produced.

In Figure 1, 1 indicates a pallet or smooth support which may be any smooth hard surface, that shown being glass. On the glass plate 1 is arranged a frame or fence 2 of wood or other desirable material, the same being held in place by some substantially water-proof cement, shellac or other desired adhesive. As shown in Figure 1, the frame 2 presents a square and consequently the finished plate 3 shown in Figure 6a will be square. As illustrated in Figure 6a, the outer surface is shown and from this figure it will be seen that the coloring matter has been distributed to give a cloudy effect common in high grade natural marble.

Referring again to Figure 1, it will be seen that green cement 4 has been arranged in the frame 2, said cement being of any desired thickness, preferably approximately half the thickness of the frame as illustrated in Figure 3. This thin layer is made merely because the cement is a very expensive, high grade cement and a thin layer of this kind is all that is necessary because a backing layer 5 as shown in Figure 4 may be used, said backing being either of the same cement or a prepared cement, preferably the latter. The cement 4 usually is white and coloring matter is added thereto. Preferably a small piece of the white cement is mixed with black coloring matter or if desired, a small piece could be mixed with black coloring matter and a second small piece with green coloring matter. The white coloring matter is then mixed with the two small pieces, after which the mixed cement is deposited as shown in Figures 1 and 2. In this way the green and black are distributed in waves or clouded effects and penetrate entirely layer 4.

After the layer 4 has been applied as just described, backing 5 could be applied or could be left off until after the layer 4 has been treated in the compression chamber 6. In either event, the slab is placed in the compression chamber 6 on shelf 7 and then pressure is applied. Compressed air from any suitable supply is supplied to the chamber 6 by turning on the valve 8. This pressure is rather quickly increased until approximately 35 pounds per square inch is secured though only a few pounds or a greater pressure may be used. Where a very low pressure is used, the slab should remain in the pressure chamber a comparatively long time, whereas if a slab is thick as indicated in Figure 3 and the pressure is 35 pounds, it is sufficient to leave the slab in the chamber anywhere from 1 to 5 minutes. After the slab has been subjected to the pressure in chamber 6 a desired time, valve 8 is turned off and valve 9 turned on whereupon the chamber 6 is released of pressure and the doors 10 and 11 may be opened, after which the slab is removed. If the backing has not yet been placed in position, it is then applied and the pallet 1 is stored away in a convenient place until the cement and backing has completely dried and hardened.

During the subjecting of the slab to the pressure in chamber 6, the air pressure thus provided will press naturally downwardly on the upper surface 12 (Figure 6) but will not press on the bottom surface or the sides or side edges by reason of the plate 1 and frame 2. This will compress the slab and as the cement is mixed with water, normally air is in the slab. By reason of the pressure producing a compression on the slab, the air in the slab will escape, the same being indicated by the dots 13 in Figure 6. As the air moves upwardly from the bottom or near the bottom of the slab, the finer cement which is in an almost liquid state will flow downwardly and form a close-grained surface 14, which is smooth and hard.

In manufacturing the artificial stone or marble, different kinds of cement may be used, but the best results have been secured by the commercial English improved marble cement now in common use on the market. Portland cement or plaster of Paris may be used under certain circumstances, but the marble cement or some other good cement is preferable because it is a finer product and produces a better surface. After the slab has been subjected to the pressure in chamber 6 and then allowed to dry and harden, it presents a smooth hard face in contact with the glass plate 1. However, it may be easily removed by inserting a thin knife or slightly bowing the plate 1. After the slab has been removed from plate 1, it is coated with a good grade of lacquer and after this has dried, it is buffed until an absolutely smooth even surface is provided, said surface being free of gas holes and maintaining the appearance of marble, created by the proper distribution of the coloring matter just mentioned. Under some circumstances, instead of merely coating the outer surface with lacquer, the entire artificial marble plate may be submerged for an hour or more in the lacquer or, if preferred, in shellac, whereby the lacquer or shellac will permeate and impregnate the entire plate as illustrated in Figure 22.

In addition, a coating or surface 15 is provided on the outer surface of the plate and a covering surface 16 will also be provided on the inner surface. After the coating has dried, the outer surface coating 15 is buffed to present a smooth polished appearance. When the plate is thus prepared, it may be used not only indoors, but out of doors and will withstand the action of the elements because of the protecting lacquer extending entirely through the plate. This is important in that artificial stone as well as natural marble is used in prominent places and must be washed and kept clean. Continued washing would injure the surface unless protected in some manner and unless the same were exceptionally hard and close-knit as indicated at 14 in Figure 6.

In Figures 7 to 11 inclusive will be seen a mold and a method illustrating how a tubular article may be formed according to the present invention with the same outer hard close-knit surface as shown in Figure 6, and with the same general characteristics. As shown in Figure 7, 17 and 18 indicate the two mold sections divided by a pair of narrow blocks 19 which blocks are separated by a dividing strip 20, the blocks 19 are of the same width as the thickness of the mold while the strip 20 extends an appreciable distance into the mold so that when a supply of colored or prepared cement 21 is applied, the same will overlap blocks 19 but be separated by the strip 20. This arrangement is desirable in order that the waves or colored matter may merge.

Preferably in applying the cement 21, it is dabbed directly on strip 20 so as to divide and go on each side as illustrated at the top and bottom of Figure 7. The strip 20 and the cement dabbed thereon is then put into chamber 6 and subjected to pressure a desired length of time whereby blocks 22 and 23 are properly compressed and set. After this has been done, the mold is removed from the chamber and the filling 25 is then applied, after which the mold sections are placed again in the chamber 6 and again subjected to pressure so that the filling 25 will be properly compressed and set. In large columns where space makes it impractical to form the column as just described, all of the mold sections 17 and 18 may be filled at one time and then subjected to compression only once, after which it is opened and clamped around the pole or other object to be covered. By this arrangement it will be noted that at both contact places of sections 17 and 18, the same structure is presented, so that the respective cement members 21 are each divided into blocks 22 and 23 which remain in place when the molds are separated but which, when put together, form a continuous structure with a matching or mating design. It will also be noted that when the mold sections are separated the respective blocks 22 and 23 project a short distance beyond the respective edges 24 of the mold sections.

Where it is desired to make an independent tubular column, the mold sections are placed together as illustrated in Figure 10 and one or more clamps 27 are used to clamp the sections together and thereby squeeze the contact portions of blocks 22 together so that a continuous tubular structure is presented.

If there should be too much cement projecting beyond the respective sections 17 and 18 the surplus cement will merely project inwardly while the outer surfaces remain in their desired position, but will merge together so that there will be no seam, it being understood that the cement is still green and not capable of supporting itself unless held by the respective mold sections. After the molds and associated parts have been arranged as shown in Figure 10, the entire structure is placed on the rollers 28 and 29 of the truck 30 shown in Figure 5. Roller 29 is connected by a belt or other suitable means to an electric motor 31 whereby it may be rotated slowly. After the parts have been placed as shown in Figure 5, the chamber is closed and air is turned on and left on for a desired length of time while the mold is rotated. The rotation of the mold is desirable in order that the action of gravity will assist the air pressure in causing the air in the cement to move away from the mold and permit the finer parts of the cement to travel toward the mold. After the parts have been subjected to the pressure for a desired length of time, it is removed from the chamber 6 and preferably set on end, and left to harden under the action of normal atmosphere temperature and pressure. After it is hardened, the clamps 27 are removed and then the molds, after which it is coated with lacquer and when the lacquer has dried, it is buffed smooth. If desired, the surface could be buffed smooth before the lacquer is placed in position and then buffed afterwards to give a polished appearance.

Under some circumstances, it is desirable to make a semi-tubular plate or an arc-shaped plate for fitting around a half-column in a building or some other half-round or partly round object. When this is the case, the mold sections 17 and 18 are arranged as shown in Figure 12 with a single strip 20' arranged between the respective mold sections and the cement then applied by any desired instrument until the parts appear as shown in Figure 12. The mold is then placed in the pressure chamber 6 as shown in Figure 5 and subjected to air pressure for a desired time. After the mold and its contents have been removed, it is allowed to dry and then is finished as stated in respect to Figure 11. However, when the mold is removed, the two slabs will separate as illustrated in Figure 13. Where a column or post is in a building or is complete and it is desired to put an outside sheeting of artificial marble thereon, the system described in Figures 14, 14a and 16 may be used. In Figure 14a, a pallet or mold is shown spread out flat while in Figure 14 it is shown rounded and provided with a parting spacer at the knife edge so that the colored artificial marble cement may be dabbed thereon to provide narrow blocks on each side thereof. This will cause the coloring matter to match when the spacer is removed. After this has been done, the mold or pallet is placed in the chamber 6 and subjected to air pressure to set the cement dabbed on the spacer and adjacent parts. After the cement has thus been set, it is removed and spread out as shown in Figure 14a where the space between the ends are filled with the cement 33 so that the mold or pallet 32 will be provided with the desired length of cement to exactly cover the column or post to be sheathed. From Figure 14a, it will be noted that the pallet 32 at one end is merely cut off in any desired manner while the other end is beveled to a knife edge at 34. It will also be noted that the cement 33 starts with the knife edge 34 and extends the desired distance which is equal to the distance around the post or column 35 to receive the marble sheeting. It will be noted that when this structure is used, the end sections of cement are first subjected to pressure and then the central section, after which it is in position to be placed on the post or column 35. Preferably the pallet and its supply of cement is immediately wrapped around the column 35 after it is removed the second time from chamber 6. By reason of the sharpened or knife edge 34, this may be done and the outer surface be continuous without a seam. After having been wrapped around as just described, one or more clamps 36 are applied and left in position until the cement has set or dried. After this has taken place, the clamps and molds are removed and preferably the surface is buffed, particularly at the point of juncture of the cement so as to remove any slight protuberances which might be present. The surface is then lacquered and after the lacquer has dried, it is buffed to present a smooth polished appearance. In this way the column will have the appearance of being a solid piece of marble from top to bottom, when, as a matter of fact, it is a column formed of any desired material with an outside sheeting of artificial marble which however, is continuous and integral throughout.

Figure 17 shows a slightly modified structure similar to that shown in Figure 14 wherein a very thin piece of paper or other material 37 which has been lacquered and buffed to a smooth surface is used, and on this is deposited the artificial marble or cement 38 in a similar manner to the way the cement 33 is deposited on sheet 32. The cement and sheet is then subjected to pressure in chamber 6 as heretofore described and then the cement is wrapped around the column in a similar way to that shown in Figure 14 with the end of the paper overlapping, after which one or more suitable clamps are provided for holding the parts in the same position until the cement has dried. By reason of the extreme thinness of the sheet 37 the beveled edge 34 is not necessary.

Figures 18 to 20 inclusive show how the slab of artificial marble may be made where the dye or coloring matter extends entirely through the marble plate. As shown in Figure 18, the glass or other suitable support or block 39 is provided, and on this is arranged a number of silk threads 40. Before being arranged as shown in Figure 18, the silk threads or yarn are submerged in a dye soluble in water. After this has been done, the threads are squeezed to remove the excess dye and then arranged as shown in Figure 18. A supply of cement 41 is then applied on top of the silk, the cement being white. After it has been properly spread, the end section 42 of the threads are grasped by the hand and pulled upwardly toward the end 43, whereupon the various threads 40 will gradually move through the cement 41 and as they move through, part of the dye therefrom will color the cement. This produces a colored strip for each thread, each strip extending entirely through the cement. After this has been done, the cement is left on the support 39 and the support and cement are subjected to pressure in chamber 6 in a similar manner as the other forms heretofore described. After this has been done, the cement is allowed to dry. When removed, it will present the appearance shown in Figure 20. The surface may then be buffed and shellacked and buffed a second time or may be lacquered, buffed, and then buffed until it is smooth and even. Where a design or figure is to be formed, the same is arranged as shown in Figure 21. The figure or design 44 is placed on a support 45 and then the cement is placed over the design and over part of the support until it fills the entire closure formed by the fence 46. When this has been done, the parts are subjected to pressure in pressure chamber 6 and after the cement has dried, it is removed, leaving a depression where it contacted with the design 44. If a depressed design is desired, the surface is lacquered and then buffed to produce a finished appearance. However, if a relief is desired, the finished plate just described is used as a mold or support and on this is placed cement as just described and finished in the same manner as the first plate.

In Figure 22, a fragmentary view is shown wherein the plate has been impregnated with a desired grade of lacquer or other substance as for instance varnish. All of the products shown in Figures 1 to 22 may be submerged in lacquer and treated as shown in Figure 22 though in many cases this is not necessary as the lacquering of the outer face produces a sufficient waterproof surface.

It has been found that glass presents a very desirable surface on which to form flat or other shaped pieces of artificial marble, but in many cases, glass cannot be used and then other surfaces may be substituted, said other surfaces being preferably smoothed by buffing or some other manner and then applied with hard lacquer and again buffed after the lacquer has dried so as to make a substantially perfect surface smooth and even throughout. Paper, wood, plaster of paris, celluloid or other material may be used and their surface prepared as just described so that when the artificial marble cement is applied thereto and subjected to air pressure substantially all the air in the cement will be caused to escape and the finer particles of the cement will flow toward the smooth prepared surface and will assume the form of said surface so that after it becomes dry, it will have the desired surface not only in regard to coloring matter but also in shape and smoothness. This preparation of the surface results in artificial marble with a very smooth and hard surface without the necessity of scraping, stoning, honing, or otherwise smoothing and polishing the surface.

I claim:

1. The method of producing artificial marble consisting in subjecting a supply of cement in a substantially liquid state to the action of air under pressure, and then subjecting the cement to the action of air under atmospheric pressure until the cement has dried.

2. The method of forming articles from marble consisting in applying a supply of cement mixed with water to a supporting surface, mixing therewith coloring matter to secure a desired clouded effect, subjecting one surface of the cement to air under pressure from one to ten minutes at a pressure of two to three atmospheres, and finally subjecting the cement to the drying action of air under atmospheric pressure until the cement has begun to set and harden.

3. The method of applying a continuous artificial marble coating to a column consisting in applying a supply of cement mortar on a flexible supporting sheet of a length equal to the circumference of the column to be covered, subjecting said cement while on said sheet to the action of air under more that one atmosphere, applying the cement while on the support to the column, applying clamps around said cement for causing the cement to be pressed tightly against the column, and finally subjecting the cement to the action of air under atmosphere pressure until the same is dried.

4. The method of producing a water proof artificial marble consisting in subjecting a supply of cement mortar formed in a desired shape to the action of air under pressure, subjecting said mortar to the drying action of air under atmospheric pressure, and then subjecting the mortar in a dried state to a lacquer until the mortar is substantially saturated with lacquer.

5. The method of producing a hollow artificial stone column consisting in applying a spacer to the mold at each line of juncture thereof for holding the parts of the mold spacer apart, applying a dividing strip to each spacer, applying a colored cement directly on top of the spacers and dividing strips within the mold for forming projecting edge sections, with the grain of the cement on the opposite sides of the dividing strips having mating edges, separating the mold, removing the spacers and dividing strips, filling each part of the mold between said edge sections with a coating of cement, placing the parts of the mold together so that said edge sections will come in contact, pressing said edge sections together so that they will merge into a substantially homogeneous mass thereby eliminating the lines of connection, subjecting the cement while in the mold to the action of air under pressure, rotating the mold and cement while under pressure, and then drying the cement by the action of air under atmospheric pressure.

HERMAN ZIEGLER.